Jan. 6, 1925.    1,521,785
W. B. MORTON
FRAMING MECHANISM FOR MOTION PICTURE MACHINES
Filed March 24, 1920     2 Sheets-Sheet 1
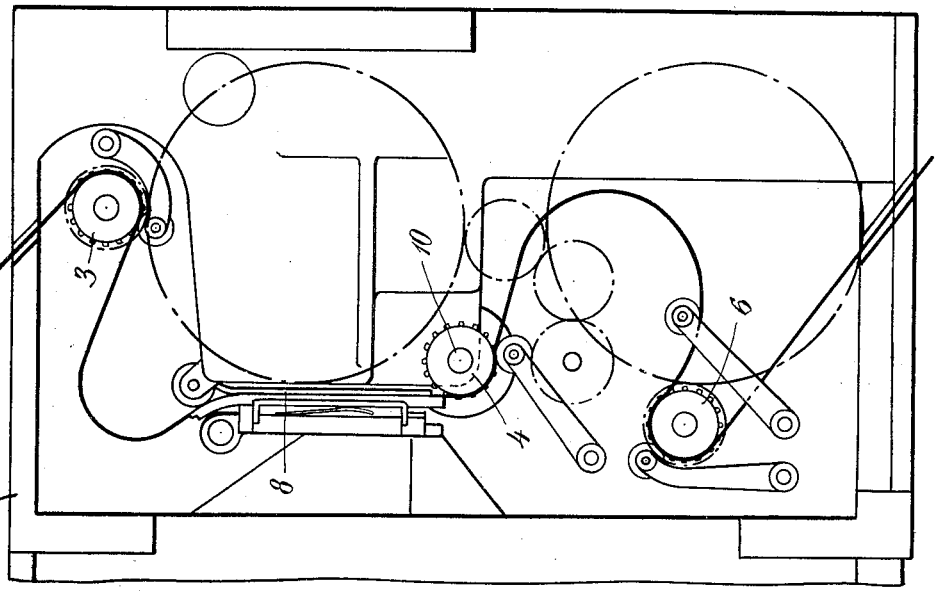
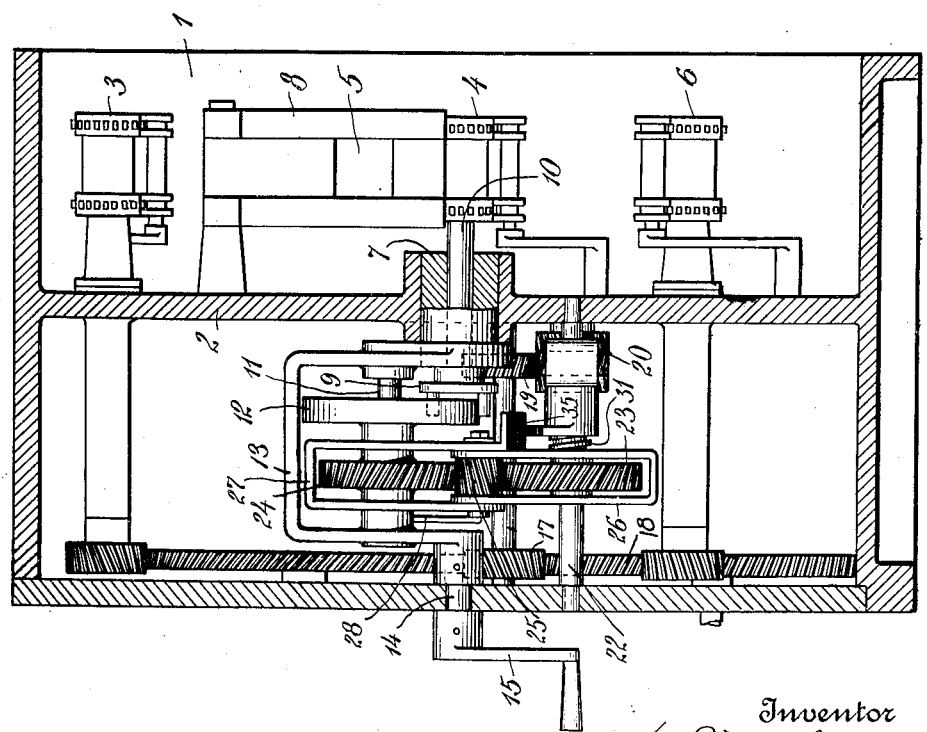
Inventor
W. B. Morton
By his Attorneys Jan. 6, 1925.
W. B. MORTON
1,521,785
FRAMING MECHANISM FOR MOTION PICTURE MACHINES
Filed March 24, 1920  2 Sheets-Sheet 2
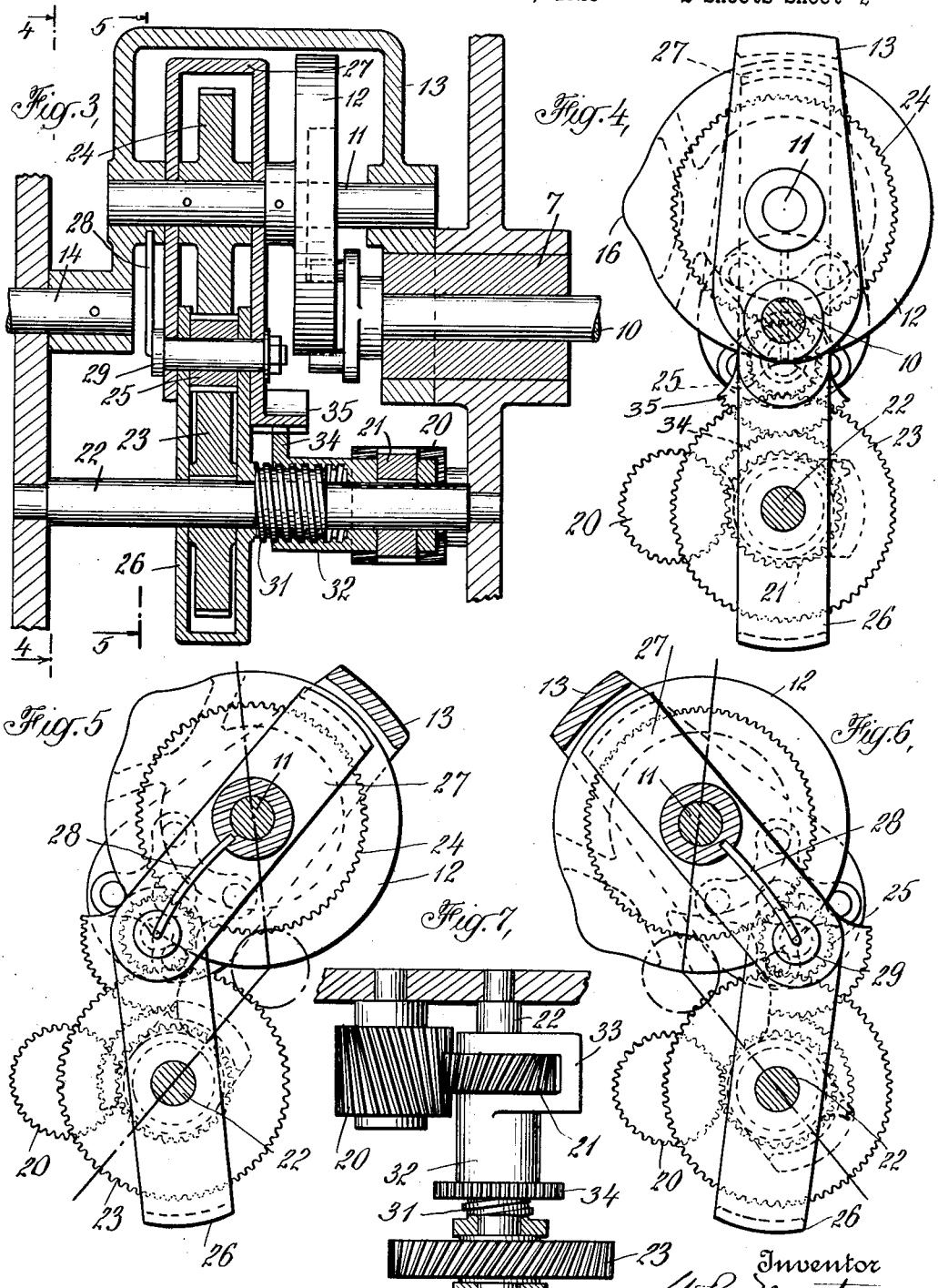

Patented Jan. 6, 1925.

1,521,785

UNITED STATES PATENT OFFICE.

WOOLRIDGE B. MORTON, OF BROOKLYN, NEW YORK, ASSIGNOR TO NICHOLAS POWER COMPANY, INC., OF NEW YORK, N. Y., A CORPORATION OF DELAWARE.

FRAMING MECHANISM FOR MOTION-PICTURE MACHINES.

Application filed March 24, 1920. Serial No. 368,351.

*To all whom it may concern:*

Be it known that I, WOOLRIDGE B. MORTON, residing at Brooklyn, in the county of Kings, State of New York, have invented certain new and useful Improvements in Framing Mechanism for Motion-Picture Machines; and I do hereby declare the following to be a full, clear, and exact description of the invention, such as will enable others skilled in the art to which it appertains to make and use the same.

This invention relates to framing mechanisms for moving picture machines, and has for its object to provide a framing mechanism in which the framing is accomplished by giving an extra movement to the intermittent sprocket in either direction to advance or retard the film without disturbing the timed relation between the operations of the sprocket and the passing of the shutter blade over the aperture.

The novel features of my invention reside particularly in the driving mechanism between the intermittent gear and the main driving shaft, whereby the adjustment of the sprocket is accomplished, such mechanism consisting primarily in a train of gears carried by an articulated gear support for adjustably supporting the driving shaft of the intermittent couple and flexibly connecting it with the stationarily supported shaft of the gear train.

The invention of the present application is in a measure an improvement upon the framing mechanism disclosed in the prior patent to Nicholas Power, No. 826,112, granted July 17, 1906, wherein the framing is accomplished by supporting the intermittent sprocket on an adjustable carriage and connecting the driving shaft to the intermittent couple, which is supported on the carriage, to the stationarily mounted driving shaft through gearing carried by articulated connections. In the present case, however, the sprocket is supported in stationary bearings instead of upon an adjustable carriage, so that its position is fixed with regard to the projection aperture. In the patented structure there is necessarily a gap of unsupported film between the armature and the sprocket which has been found to produce a whip-lash action in the film when the machine is operated at abnormal speed, unless the film be held by a spring guide of excessive pressure. By having the sprocket stationary the guides for the film will extend in close juxtaposition to the periphery of the sprocket so that it may be held flat at the aperture with much less pressure than in the patented machine.

The present invention also involves a novel arrangement of the articulated gear support whereby the relative movement of one gear about the axis of rotation of the adjacent gear is reduced to a minimum, so that the full framing movement does not materially disturb the synchronism between the intermittent sprocket and the shutter. By this arrangement the compensating mechanism between the sprocket and shutter may, if desired, be dispensed with, or a simple mechanism may be used which will maintain the sprocket and shutter in exact synchronism.

In the accompanying drawings I have shown a preferred embodiment of my invention applied to a moving picture machine of typical design.

In said drawings,

Fig. 1 is a transverse vertical section through the casing of a moving picture machine equipped with my improved framing device;

Fig. 2 is a side elevation of the machine looking from the right of Fig. 1, with certain parts shown in section;

Fig. 3 is an enlarged detail view of a portion of the framing mechanism shown in Fig. 1 with certain parts thereof shown in section.

Figs. 4, 5 and 6 are diagrammatic views of portions of the framing mechanism showing the parts in different positions of adjustment; and Fig. 7 is a sectional detail of a portion of the compensating mechanism shown in Fig. 3.

Referring to the drawings, particularly to Fig. 1, 1 indicates the casing of the machine comprising, as shown, two compartments separated by a vertical web 2 extending longitudinally of the machine, the web 2 supporting the film feeding parts and their driving connections.

The driving connections comprise the usual upper continuous sprocket 3 for drawing the film from the magazine, not shown, the intermediate intermittent sprocket 4 operating to feed the film step by step past the projection aperture 5, and the lower continuously operated sprocket 6 which delivers the film to the take-up reel.

The shaft of the intermittent sprocket is supported in a fixed bearing 7 adjacent the lower end of the guide plate 8 containing the projection aperture 5, and the framing is accomplished by giving to the intermittent sprocket an independent partial rotation in one direction or the other to advance or retard the film, as may be necessary to secure registration of the picture with the aperture and it is the mechanism for so rotating the sprocket which constitutes the subject-matter of the present invention.

The intermittent movement selected for illustration comprises a cam and pin cross such as disclosed in the prior patent to Nicholas Power, No. 1,129,121, granted February 23, 1915, the pin cross 9 being rigidly attached to the end of the sprocket shaft 10 which projects through its bearing 7 into the gear compartment of the casing. The bearing is slightly larger in diameter than the pin cross, so that the sprocket with the pin cross may be readily withdrawn for adjustment and inspection. Also, the bearing 7 may be slightly eccentric so that the sprocket shaft can be slightly adjusted toward and away from the center of the shaft 11 of the cam 12 to take up wear between the parts.

The shaft 11 is mounted in a yoke 13, one end of which is fulcrumed on the bearing 7 of the sprocket shaft, while the other end is supported by a pin 14 mounted in the outer wall of the gear compartment and carrying on its projecting end a crank lever or framing handle 15 for oscillating the yoke on its bearings to thereby partially rotate the intermittent sprocket and frame the picture.

In Figs. 4, 5 and 6 I have diagrammtically illustrated the effect of tilting the yoke 13 about its axis. Fig. 4 shows the position of the parts with the cam shaft 11 vertically above the bearings of the yoke, and with the actuating projection 16 at right angles to the position of the pin cross 9. It will be noted that the two pins on the inside of the cam lie in the same horizontal plane as do the two pins on the outside of the cam. In Fig. 5 the yoke 13 has been tilted to an angle of 45 degrees in a clockwise direction from the position shown in Fig. 4, and in so doing the pin cross has been turned through a similar angle by reason of the engagement of its pins with the cam ring and the line connecting the two pins on the inside of the cam ring is no longer horizontal, but lies at an angle of 45 degrees to the horizontal. Fig. 6 shows the yoke tilted to an angle of 45 degrees in a counter-clockwise direction from the position shown in Fig. 4 with a corresponding adjustment of the pin cross in the same direction and to the same extent.

It will also be observed that in Figs. 5 and 6 the actuating projection 16 of the cam bears its same relative position to the pin cross so that the cycle of operations of the intermittent is not altered by the framing of the picture, that is, the same length of time between successive intermittent movements of the sprocket lapses whether or not the framing lever is adjusted.

This effect of framing mechanism is accomplished by driving the cam shaft through a gear train so designed as to automatically compensate for the rotation of the cam shaft about its own axis which would otherwise be incidental to the framing movement. This driving mechanism comprises a pinion 17 whose shaft is supported in the opposite side walls of the gear compartment and which meshes with the main driving gear 18 through which the power is applied to the machine from the motor or hand crank, not shown. Attached to the shaft of the pinion 17 is a second pinion 19 which in turn drives a broad idler 20 supported on a stub shaft set in the partition 2 of the casing. The idler, the pinions and the gear 18 all have spiral teeth so that the machine will be quiet in operation and also to provide for the compensating adjustment which will be later described.

Meshing with the idler 20 is a pinion 21 keyed on a cross shaft 22 supported for rotation in the walls of the frame. Attached to the shaft 22 is a gear 23 which drives a gear 24 fast on the cam shaft 11 through an idler 25 which is maintained in mesh with the gears 23 and 24 during the framing movement by means of two yokes 26 and 27 mounted on the shafts 22 and 11, respectively, with their ends pivotally connected by the shaft of the idler 25, the construction forming a toggle link connection similar to that described in the above mentioned patent to Nicholas Power.

Figs. 4, 5 and 6 show the relative positions of the yokes 26 and 27 during the framing movement. In the middle framing position shown in Fig. 4, the shaft 11 is at its maximum distance from the fixed shaft 22 from which it is driven, and any adjustment in either direction brings the shaft 11 nearer the shaft 22, as will be obvious. In such movement the idler 25 cannot, of course, remain in a direct line connecting the axes of the shaft, but is pushed to one side as necessitated by the pivotally connected yokes 26 and 27, the idler remaining in mesh with the two gears.

The adjustment of the yoke 13 serves to break the toggle and if the machine were not running, would insure the shifting of the pinion in the proper direction when adjusted from the middle position shown in Fig. 4 to one side or the other of the middle position, as shown in Figs. 5 and 6 However, when the machine is running there may be a tendency for the pinion to be dragged around the driving gear in a direction which might be contrary to the direction to which it would be turned by the framing adjustment alone, thereby causing a slight binding at the middle neutral position with the possible adjustment of the pinion in the wrong direction, that is, the pinion 25, instead of being adjusted to the left, as shown in Fig. 5, when the yoke 13 is adjusted to the right, might also be adjusted to the right to the position shown in dot and dash lines, thereby throwing the intermittent movement out of synchronism with the shutter operation. To avoid this contingency, I provide means whereby, when the toggle is broken, the pinion will be shifted in the proper direction by the movement of the yoke 13. As shown, this device comprises a simple spring wire 28 having one end set in a hole in the hub of the yoke 13 and its other end attached to the head of the pin 29 which forms the axis of the pinion 25. The wire is set so as to project radially downward from the hub of the yoke 13 in parallelism with the arm of the yoke, so that the wire tends to remain in parallelism with the arm of the yoke 13 as it is adjusted to one side or the other of its neutral position.

As the yoke 13 is turned the end of the wire attached to the pin 29 lies below the axis of oscillation of the yoke 13 and therefore tends to shift the pin 29, that is, the knuckle of the toggle, in the opposite direction from the adjustment of the yoke, as will be obvious from the drawings.

As the distance from the shaft 11 to the axis of oscillation of the yoke 13 is less than the corresponding distance to the pin 29, the angle through which the yoke 26 is adjusted by the adjustment of the yoke 13 will be less than the angle of the yoke 13, as illustrated in Figs. 5 and 6, so that the tendency of the spring is to maintain the pinion as far away from the gears 23 and 24 as the bearings permit, that is, the spring not only insures the adjustment of the pinion in the proper direction when the framing is effected, but prevents the pinion being cramped between the two gears.

The shutter is driven from the shaft of the upper sprocket 3 and should of course be so positioned with respect to the operation of the intermittent sprocket for the wing of the shutter to pass across the aperture during the period that the film is in motion. If the shutter and intermittent gear are accurately adjusted with respect to each other the width of the shutter when measured in degrees need be no greater than the number of degrees of a total complete revolution that the sprocket is in motion, plus, of course, sufficient width to cover the aperture before the movement of the sprocket begins. It is usually the practice to have the shutter wing a few degrees wider than obsolutely necessary for this purpose to take care of the wear of the gears and to allow for slight inaccuracies in the adjustment of the shutter. If the shutter does not cover the aperture throughout the entire movement of the film there will be produced what is known as a "ghost" effect, that is, the high lights of the picture will have a streaked appearance which detracts greatly from the picture.

As will be observed in Figs. 5 and 6, which show the extreme positions of adjustment necessary to permit a full framing of the picture, the extent of movement of the pinion 25 about the axes of the gears 23 and 24 is but a few degrees, and therefore the extent to which the cam 12 would be rotated on its own axis is very slight and not sufficient to cause the "ghost" effect in the picture if the shutter wing is a few degrees wider than actually necessary to cover the movement of the picture, and the framing mechanism as so far described may be used with entire satisfaction without the compensating device. However, in order that the shutter may be kept down to its minimum width there is preferably provided a compensating device which effects a slight rotation of the shaft 22 in a direction to compensate for the slight rotation imparted to the cam by the adjustment of the pinion 25. It is for this purpose that the idler 20 is broader than necessary to mesh with the gear 21 and the latter is slidingly mounted on the shaft 22. As the teeth of the idler and pinion are spiral a longitudinal adjustment of the pinion over the idler will cause a rotative adjustment of the pinion and with it the shaft 22.

This sliding adjustment of the pinion may be effected in any suitable manner, the mechanism illustrated for the purpose comprising a threaded hub 31 formed on the side of the yoke 27 adjacent the pinion 21 upon which is threaded a sleeve 32 attached to a cage 33 which embraces the pinion 21 to cause the pinion to slide with the cage while allowing free rotation of the pinion and the shaft within the cage. The end of the sleeve 32 adjacent the side of the yoke is provided with a toothed sector 34 which meshes with a correspondingly toothed flange 35 formed on the end of the yoke 27 which projects below the pin 29.

As the toggle is bent during the framing adjustment, the intermeshing teeth on the flange and sector will cause a rotation of the sleeve about the threaded hub 31, thereby slightly adjusting the cage and the pinion 21 longitudinally of the shaft 22, the adjustment being in proportion to the extent of the framing movement.

The operation of the mechanism has been sufficiently described in connection with the description of the structure. The framing mechanism has a manifest advantage over that described in the patent to Nicholas Power in that the intermittent sprocket is supported in a stationary bearing, so that its position remains fixed with regard to the aperture plate 8 instead of having a constantly varying position as in the Power patent. Also, the rotary adjustment of the yoke 13 as compared with the rectilinear adjustment of the sprocket-supporting carriage of the Power patent necessitates a much smaller adjustment of the intermediate connecting parts with a consequent lessening of the extent to which the sprocket is put out of synchronism with the shutter. The length of the machine is also shortened and the entire mechanism made more rugged and compact.

It will be understood that various changes may be made in the structural details of the above described mechanism, for instance, the usual framing handle may be employed in place of the crank 15 and instead of the intermittent cam gear selected for illustration an ordinary Geneva gear may be employed. It will also be understood that the patent is not limited to the above described details except in so far as recited in the appended claims.

I claim:

1. In a moving picture machine comprising a shutter, a framing mechanism comprising an intermittent sprocket having fixedly supported bearings, a driving shaft having fixedly supported bearings, a train of gearing embodying an intermittent couple between said shafts and an articulated support for certain of said gears, said gearing permitting a partial rotation of the intermittent sprocket without corresponding movement of the shutter.

2. In a moving picture machine, a framing mechanism comprising an intermittent sprocket having fixedly supported bearings, a driving shaft having fixedly supported bearings, a train of gearing embodying an intermittent couple between said shafts and an articulated support for certain of said gears, said articulated support comprising a member pivotally adjustable about the axis of said sprocket and a second supporting member pivotally adjustable about the axis of said driving gear.

3. In a moving picture machine, a framing mechanism comprising an intermittent sprocket having fixedly supported bearings, a driving shaft having fixedly supported bearings, a train of gearing embodying an intermittent couple between said shafts and an articulated support for certain of said gears, said articulated support comprising a member pivotally adjustable about the axis of said sprocket and a second supporting member pivotally adjustable about the axis of said driving gear, and an intermediate support pivotally connected to both said first mentioned supports.

4. In framing mechanism for moving picture machines, the combination of an intermittent sprocket, a stationary shaft from which said intermittent sprocket is actuated and connections between said shaft and the said sprocket comprising a gear support rotatably adjustable with respect to the axis of said sprocket, a second gear support rotatably adjustable with respect to the axis of said driving shaft, and intermeshing gears carried by said supports.

5. In framing mechanism for moving picture machines, the combination of an intermittent sprocket supported in fixed position, an intermittent couple for driving said sprocket, a support for the driving member of said couple rotatably adjustable about the axis of said sprocket, a driving shaft having fixed bearings out of line with the axis of said sprocket and gearing between said driving shaft and the driving member of said intermittent couple arranged to maintain a driving connection between said shaft and said driving member in all positions of adjustment of the latter, said driving connection comprising an intermediate gear support adjustable with respect to the support for said driving member.

6. In framing mechanism for moving picture machines, the combination of an intermittent sprocket supported in fixed position, an intermittent couple for driving said sprocket, a support for the driving member of said couple rotatably adjustable about the axis of said sprocket, a driving shaft having fixed bearings out of line with the axis of said sprocket, gearing between said driving shaft and the driving member of said intermittent couple arranged to maintain a driving connection between said shaft and said driving member in all positions of adjustment of the latter, said driving connection comprising an intermediate gear support adjustable with respect to the support for said driving member, and connections between said supports for effecting a simultaneous adjustment thereof.

7. In a moving picture machine comprising a shutter, the combination of an intermittent sprocket, gearing for driving the sprocket and shutter in timed relation, said gearing comprising a stationary driving shaft for said intermittent sprocket, gearing between said sprocket and said shaft, an adjustable shaft for a portion of said gearing whereby the framing of the picture may be effected and a compensating mechanism for maintaining the timed relation between the shutter and the intermittent sprocket comprising means operated simultaneously with said adjustable gear support for advancing and retarding said driving shaft.

8. In framing mechanism for motion picture machines, the combination of an intermittent sprocket supported in fixed position, a driving shaft therefor supported in fixed position and out of alinement with said sprocket shaft, gearing intermediate said sprocket and said shaft, an adjustable support for said gearing and means actuated in synchronism with the adjustment of said support for advancing and retarding said driving shaft.

9. In framing mechanism for motion picture machines, the combination of an intermittent sprocket mounted in fixed position, an intermittent couple for driving said sprocket, the driving member thereof being adjustable with respect to the axis of said sprocket, a driving shaft for said couple supported in fixed position out of axial alinement with the shaft of said sprocket, gearing between the driving member of said intermittent couple and said shaft for operating the former, said gearing comprising an intermediate gear support adjustable independently of the driving member of the said intermittent couple.

10. In framing mechanism for motion picture machines, the combination of an intermittent sprocket mounted in fixed position, an intermittent couple for driving said sprocket, the driving member thereof being adjustable with respect to the axis of said sprocket, a driving shaft for said couple supported in fixed position out of axial alinement with the shaft of said sprocket, gearing between the driving member of said intermittent couple and said shaft for operating the former, said gearing comprising an intermediate gear support adjustable independently of the driving member of the said intermittent couple, and means for advancing and retarding said driving shaft in synchronism with the adjustment of said gear support to prevent rotation of the driving member of said couple about its own axis.

11. In a framing mechanism for motion picture machines, an intermittent sprocket, a driving shaft, and means for imparting a partial rotation to said sprocket without disturbing its timed relation with said driving shaft, comprising a gear intermediate said driving shaft and sprocket mounted for movement longitudinally of its shaft.

12. In a framing mechanism for motion picture machines, an intermittent sprocket, a driving shaft, and means for imparting a partial rotation to said sprocket without disturbing its timed relation with said driving shaft, comprising a spiral gear intermediate said driving shaft and sprocket mounted for movement longitudinally of its shaft in mesh with a cooperating spiral gear, and connections for moving said gear longitudinally of its shaft during the framing operation.

13. In a framing mechanism for motion picture machines, an intermittent sprocket, a driving shaft and means for imparting a partial rotation to said sprocket without disturbing its timed relation with said driving shaft, comprising a spiral gear intermediate said driving shaft and sprocket mounted for movement longitudinally of its shaft in mesh with a cooperating spiral gear, and connections for moving said gear longitudinally of its shaft during the framing operation, the relative longitudinal movement of said spiral gears effecting relative rotative movement of said gears for neutralizing the rotative movement produced by the adjustment of said intermittent sprocket.

In testimony whereof I affix my signature.

WOOLRIDGE B. MORTON.

Certificate of Correction.

It is hereby certified that in Letters Patent No. 1,521,785, granted January 6, 1925, upon the application of Woolridge B. Morton, of Brooklyn, New York, for an improvement in "Framing Mechanism for Motion-Picture Machines," an error appears in the printed specification requiring correction as follows: Page 1, line 50, for the word "armature" read *aperture;* and that the said Letters Patent should be read with this correction therein that the same may conform to the record of the case in the Patent Office.

Signed and sealed this 17th day of February, A. D. 1925.

[SEAL.]
KARL FENNING,
*Acting Commissioner of Patents.*